(12) United States Patent
Lecole et al.

(10) Patent No.: US 7,744,501 B2
(45) Date of Patent: Jun. 29, 2010

(54) AUTOMATIC VEHICLE STOP CONTROL METHOD

(75) Inventors: Brice Lecole, Paris (FR); Magali Laurence, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 604 days.

(21) Appl. No.: 11/575,765

(22) PCT Filed: Sep. 22, 2005

(86) PCT No.: PCT/FR2005/002353

§ 371 (c)(1), (2), (4) Date: Mar. 22, 2007

(87) PCT Pub. No.: WO2006/032793

PCT Pub. Date: Mar. 30, 2006

(65) Prior Publication Data

US 2008/0010001 A1 Jan. 10, 2008

(30) Foreign Application Priority Data

Sep. 23, 2004 (FR) .................................. 04 10094

(51) Int. Cl.
 *B60K 6/20* (2007.10)
(52) U.S. Cl. .............................. 477/5; 477/90; 903/941
(58) Field of Classification Search ........................ None
 See application file for complete search history.

(56) References Cited

U.S. PATENT DOCUMENTS

| | | | |
|---|---|---|---|
| 4,381,042 A | 4/1983 | Perry | |
| 6,679,214 B2 * | 1/2004 | Kobayashi et al. | 123/179.4 |
| 6,830,534 B2 | 12/2004 | Seibertz et al. | |
| 7,099,768 B2 | 8/2006 | Moriya | |
| 2003/0087724 A1 | 5/2003 | Seibertz et al. | |
| 2004/0149245 A1 | 8/2004 | Moriya | |
| 2004/0159479 A1 * | 8/2004 | Morimoto et al. | 180/65.3 |
| 2006/0199696 A1 * | 9/2006 | Gouda et al. | 477/3 |
| 2007/0080006 A1 * | 4/2007 | Yamaguchi | 180/65.3 |
| 2007/0099755 A1 * | 5/2007 | Shim | 477/107 |

FOREIGN PATENT DOCUMENTS

| | | |
|---|---|---|
| EP | 1 052 399 A2 | 11/2000 |
| EP | 1 059 441 A2 | 12/2000 |
| EP | 1 396 622 A1 | 3/2004 |
| EP | 1 469 195 A1 | 10/2004 |

* cited by examiner

Primary Examiner—Sherry Estremsky
(74) Attorney, Agent, or Firm—Jacox, Meckstroth & Jenkins (57) ABSTRACT

A stop control method which is intended for a heat engine of a vehicle that is equipped with a reversible electric machine. According to the invention, a decision is made to stop the heat engine as a function of: (i) steady conditions which are essentially stable prior to a stopping phase; and (ii) variable conditions which can change following a positive test on the steady conditions and prior to a stopping phase, said steady conditions being tested prior to the variable conditions. The invention is suitable for motor vehicles.

17 Claims, 4 Drawing Sheets

AUTOMATIC VEHICLE STOP CONTROL METHOD

FIELD OF THE INVENTION

The present invention concerns a method of controlling the stopping of the thermal engine of a vehicle.

DESCRIPTION OF THE RELATED ART

The control method makes it possible to implement, for the thermal engine, a functioning with automatic cutoff and starting (including restarting) of the thermal engine, functioning known by the English term "Stop and Go".

To this end, the control method, under certain conditions, causes the complete stopping of the thermal engine when the vehicle is itself stopped, and then restarts the thermal engine following, for example, an action by the driver interpreted as a request for restarting. Thus the method of controlling stopping also generally comprises a restart command. A typical situation of "Stop and Go" is that of stopping at a red light. When the vehicle stops at the light, the thermal engine is automatically stopped and then, when the light goes green again, the engine is restarted, in particular by means of a rotary electrical machine, following the detection of the pressing of the clutch pedal by the driver or any other action that can be interpreted as the intention of the driver to restart his vehicle. The advantage of this functioning in "Stop and Go" will thus be understood in terms of energy saving and pollution reduction, in particular in an urban environment.

However, these circumstances of implementing the "Stop and Go" functioning remains very special and does not cover all situations where automatic stopping control may be called upon.

SUMMARY OF THE INVENTION

Thus one technical problem to be resolved by the object of the present invention is to propose a method of controlling the stopping of the thermal engine of a motor vehicle that makes it possible to define the conditions in which an instruction to stop the thermal engine of the vehicle, initially in movement, may be established in the context of a "Stop and Go" functioning.

One solution to the technical problem posed consists, according to a first object of the present invention, of the control method comprising the steps of:

deciding on the stopping of the thermal engine according on the one hand to so-called steady conditions substantially stable before a stopping phase, and on the other hand so-called variable conditions, liable to develop after a positive test on the steady conditions and before a stopping phase, and testing the steady conditions prior to the variable conditions.

Thus the invention distinguishes two major categories of conditions for stopping the thermal engine that must be cumulatively verified in order to trigger an instruction to stop the thermal engine and therefore an execution of a stopping phase.

The steady conditions are not very liable to change between the moment they are verified and the sending of a stop instruction, and these conditions may therefore be tested firstly in the knowledge that it is improbable that they will be subsequently called into question. Their verification therefore consists of a step prior to the taking of a decision to stop the thermal engine.

The variable conditions may conversely change all the time. It may in fact happen that they become true, and cause an instruction to stop, whereas initially they were not true. This is why these conditions must be tested last, after having verified that the steady conditions are true.

According to non-limiting preferential embodiments, the invention provides for the following characteristics.

In a supplementary step, provision is made to execute a stop phase if the variable conditions are true.

This classification of the stop conditions as steady conditions and variable conditions makes it possible moreover to envisage an embodiment of the invention according to which, after a positive test on the steady conditions, a warning signal is sent intended to inform of a probable stopping of the thermal engine.

Advantage is thus taken of the stability over time of the steady conditions in order to warn the vehicle driver early on that the thermal engine is liable to be stopped at any time.

Next the invention provides that, after the sending of the warning signal, the steady conditions are tested once again, prior to the test on the variable conditions. This precaution is taken so as to ensure that the steady conditions have not changed during the sending of the warning signal, even if this change is improbable.

According to the invention, the warning signal is a light signal, which may for example be produced by blinking light-emitting diodes.

In accordance with the invention, the steady conditions comprise, separately or in combination, so-called behavioral conditions relating to an action of the vehicle driver and so-called safety conditions relating to the functioning of the vehicle.

In particular, the behavioral conditions comprise, separately or in combination, an action on a means of activating/deactivating the control for stopping the thermal engine, a closing of the driver's door, the presence of the driver in the vehicle if the driver's door has been opened, closing of the vehicle bonnet, a speed of the vehicle lower than the given speed, a gear lever in a neutral position and the clutch pedal released, a minimum speed reached by the vehicle since the previous stopping, and, if the vehicle is equipped with an activated air conditioning device, a temperature of the vehicle included in a given temperature range.

Since it is a case more especially of the detection of the presence of the driver in the vehicle, the invention provides for this detection to be validated and therefore for the driver to be considered present in the vehicle if at least one of the following conditions is fulfilled:

a safety belt of the driver is fastened, an ignition key is actuated in the starting position, the following sequence is carried out: a clutch pedal is completely pressed, a gear lever is engaged in a non-neutral position and a clutch pedal is released.

According to the invention, the safety conditions comprise, separately or in combination, a temperature of the electronics of a rotary electrical machine coupled to the thermal engine lower than a given temperature, a speed of the thermal engine lower than a given speed, the absence of a prohibition on a restarting instruction, and an expiry of a given period after a failure to stop the thermal engine.

In accordance with the invention, the variable conditions comprise, separately or in combination, a sufficient battery charge state, a temperature of the thermal engine higher than a given temperature, and expiry of a pause of a duration variable with the maximum speed reached since the previous stop phase.

In addition, the invention also concerns the execution of the instructions to stop the thermal engine, requested of an engine control for the thermal engine when all the stopping conditions, whether they be steady or variable, are tested and verified as true.

In this regard, an advantageous embodiment of the invention proposes to open a window for monitoring the speed of the thermal engine of given duration following an instruction to stop the thermal engine.

The invention then makes provision for sending a request to restart the thermal engine if the speed of the thermal engine remains greater than a given speed within the said monitoring window.

The invention also makes provision for sending a new stop instruction in the event of failure of a first stop instruction only after the expiry of a given interval of time, so as to make it possible to correct the abnormality that led to failure of the first stop instruction.

Finally, according to an operating mode of the invention referred to as "reflex restarting", a restart instruction is sent during a stop phase if the stop conditions are no longer verified. Restarting is then requested before the complete stopping of the engine provided that the stop conditions are no longer all verified. This makes it possible to have rapid restarting.

According to a second object of the invention, the invention proposes a rotary electrical machine comprising a device for implementing the control method according to any one of the preceding characteristics.

According to a third object of the invention, the invention proposes a device for controlling the stopping of the thermal engine of a motor vehicle, characterized in that it comprises:

means for deciding on the automatic stopping of the thermal engine according on the one hand to so-called steady conditions, substantially stable before a stop phase, and on the other hand so-called variable conditions, liable to evolve after a positive test on the steady conditions and before a stop phase, means for testing the steady conditions prior to the variable conditions.

In addition the said device comprises:

means for executing a stop phase if the variable conditions are true.

In addition, the device comprises means for sending a warning signal intended to inform of a probable stopping of the thermal engine, after a positive test on the steady conditions.

The description that follows with regard to the accompanying drawings, given by way of non-limiting examples, will give a clear understanding of what the invention consists and how it can be implemented.

These and other objects and advantages of the invention will be apparent from the following description, the accompanying drawings and the appended claims.

DETAILED DESCRIPTION OF PREFERENTIAL EMBODIMENTS OF THE INVENTION

Figure 1:
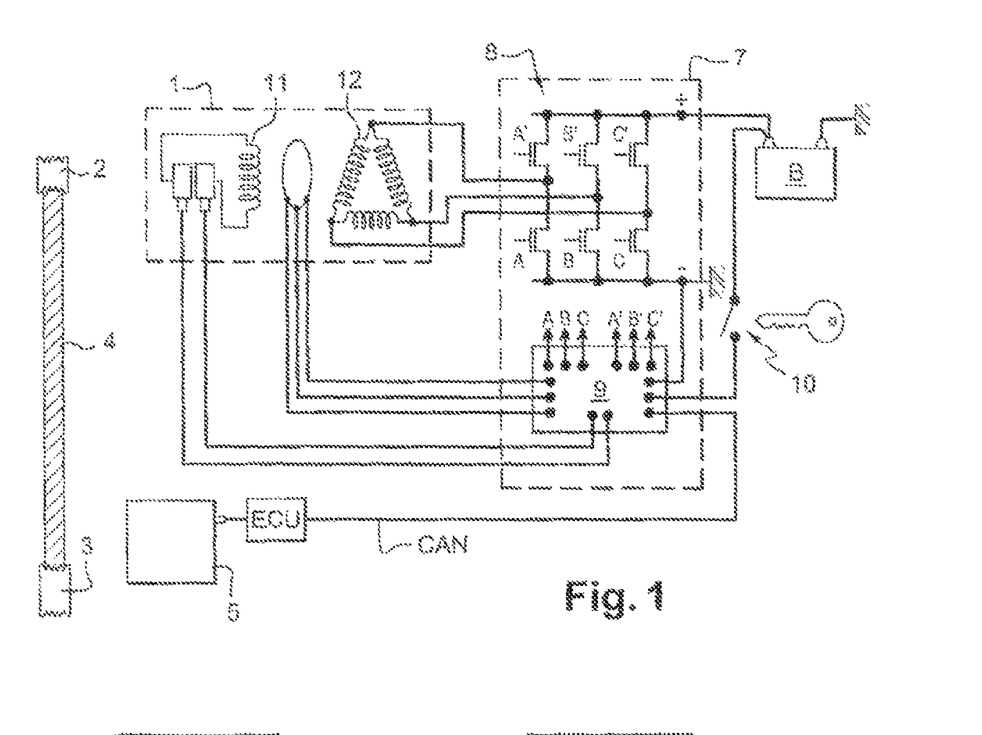
FIG. 1 is a diagram illustrating a motor vehicle in which the control method according to the invention is implemented.

According to FIG. 1, a vehicle comprises:

a thermal engine 5 comprising a control unit called an engine control unit ECU, the unit also being able to be independent of the said thermal engine, the engine control unit ECU supplying in particular the engine speed, the vehicle speed and the thermal engine temperature, a separate rotary electrical machine 1. In the remainder of the description, an alternator/starter is taken as a non-limiting example of a rotary electrical machine. A conventional starter can also be taken as an example.

Such an alternator/starter comprises a rotor 11 and a stator 12, a shaft terminating in a pulley 2 that is connected to a pulley 3 on the crankshaft of the thermal engine by means of a belt 4. This alternator/starter is mounted in the place normally taken by the alternator. In general terms, a reversible rotary electrical machine such as an alternator/starter combines two distinct functions, namely, firstly the conventional alternator function when the shaft of the thermal engine drives the rotor 11 of the machine so as to produce an electric current to the stator, and secondly the starter function when conversely a current applied to the stator of the machine causes the rotor to be rotated, which then drives the shaft of the thermal engine in a similar manner to a conventional starter.

The alternator/starter 1 comprises control electronics 7 comprising:

a transistor bridge 8 that constitutes a reversible power converter and that provides control in starter mode and synchronous rectification in alternator mode;

a management module 9 that controls the various transistors (A, B, C, A', B', C') of the converter 8 and in particular manages the following various functions:

power in starter and alternator modes regulation in alternator mode transition from starter mode to alternator mode.

The management module 9 is for this purpose supplied by the voltage of the battery, referenced B, to which it is connected by means of an ignition switch 10 of the vehicle. The management module 9 communicates with the engine control unit ECU by means of a communication bus CAN, the bus making it possible to send back information such as in particular the engine speed VM of the thermal engine.

It should be noted that, according to a non-limiting preferential embodiment, the stopping strategy comprised in the "Stop and Go" strategy according to the control method is downloaded into a flash or EEPROM memory (not shown) of a control device such as a microcontroller of the rotary electrical machine, here in the alternator/starter. The microcontroller is situated in the management module 9 of the alternator/starter.

According to another non-limiting embodiment, this strategy may also be downloaded into the memory of a control device included in the engine control ECU.

FIGS. 2A, 2B, 2C, and 2D show diagrams depicting the management of the stop conditions by the stop control method according to non-limiting preferential embodiments.

Figure 2A:
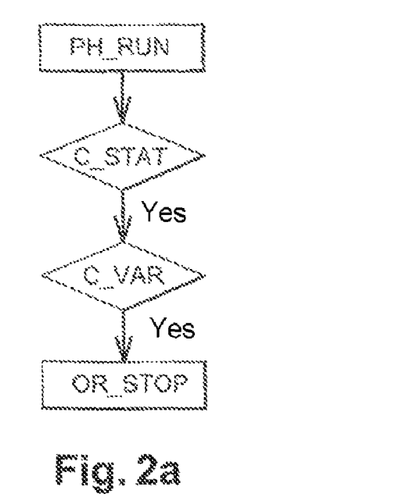
FIG. 2A is a diagram illustrating, according to a first non-limiting embodiment, a management of the stop conditions by a control method according to the invention.

The control method manages the conditions in the following manner as illustrated in FIG. 2A according to a first embodiment.

When still in engine phase PH_RUN, that is to say the thermal engine is not stopped, the steady conditions C_STAT are tested, If the steady conditions are all true following a positive test, the variable conditions C_VAR are tested.

If all the variable conditions are also all verified, an instruction OR_STOP to stop the thermal engine is sent to the engine control ECU of the thermal engine. A stop phase is thus executed. The engine control ECU manages the stopping of the thermal engine by for example stopping the injection of fuel into the engine.

The control method manages the conditions in the following manner as illustrated in FIG. 2A according to a first embodiment.

When still in engine phase PH_RUN, that is to say the thermal engine is not stopped, the steady conditions C_STAT are tested, If the steady conditions are all true following a positive test, the variable conditions C_VAR are tested.

If all the variable conditions are also all verified, an instruction OR_STOP to stop the thermal engine is sent to the engine control ECU of the thermal engine. A stop phase is thus executed. The engine control ECU manages the stopping of the thermal engine by for example stopping the injection of fuel into the engine.

It should be noted that a stop phase is determined by:

a stop order sent to the engine control ECU of the thermal engine, which defines the beginning of the stop phase, and a thermal engine speed VM less than a certain number of revolutions per minute, which defines that the engine is stopped, for example preferably 100 revolutions/min, thus defining the end of the stop phase, or an expired time period also defining the end of the stop phase, as will be seen in detail later.

It should be noted that it may be decided not to stop the thermal engine initially, but to go into a state where the driver is informed that his engine is liable to stop at any moment.

Figure 2B:
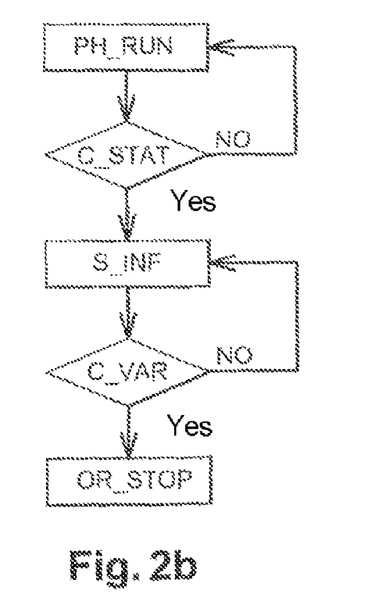
FIG. 2B is a diagram illustrating, according to a second non-limiting embodiment, a management of the stop conditions by a control method according to the invention.

Thus, in a second preferential embodiment, after having tested the steady conditions C_STAT and the latter are all true following a positive test, the driver is informed that the engine may stop at any moment as illustrated in FIG. 2B, and then the variable conditions C_VAR are tested. This information on a probable imminent stopping supplied by means of a warning signal S_INF such as a light signal emitted by light-emitting diodes that blink for example, an intermittent audible signal or a text or symbol signal displayed on the dashboard of the vehicle in non-limiting examples. This warning thus avoids the driver being surprised by such an automatic stopping.

Figure 2C:
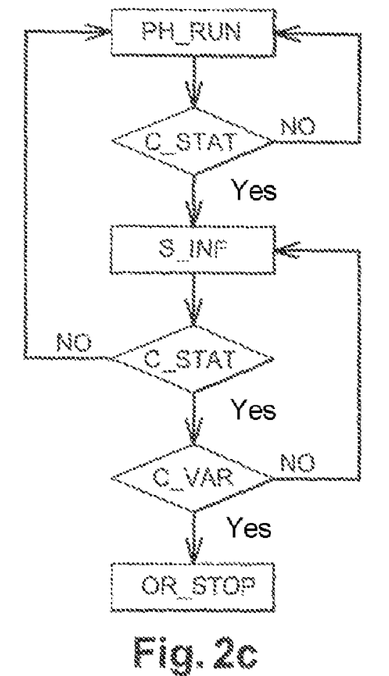
FIG. 2C is a diagram illustrating, according to a non-limiting variant embodiment, a management of stop conditions by a control method according to the invention.

In a first variant embodiment of the second mode, the steady conditions are once again tested during the sending of the warning signal, before testing the variable conditions as indicated in FIG. 2C. This makes it possible to ensure that the steady conditions have not changed during the sending of the warning signal, even if this change is very improbable. Such a change may occur, for example, when the vehicle has stopped when arriving at a red light but the driver has gone into first and pressed on the accelerator pedal in order to restart, before the variable conditions have been tested.

In a third non-limiting embodiment, after having tested the steady conditions and the latter are all true, the variable conditions are tested, and then the driver is informed that the engine may stop at any moment if the variable conditions are all true.

Figure 2D:
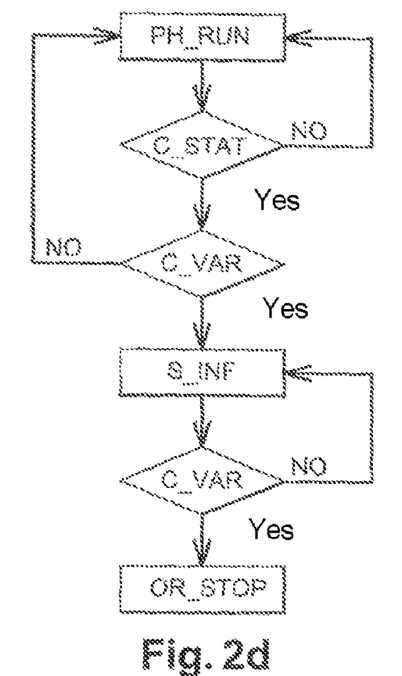
FIG. 2D is a diagram illustrating, according to a variant of a third non-limiting embodiment, a management of the stop conditions by a control method according to the invention.

In a first variant embodiment of the third mode, during the sending of a warning signal, the variable conditions are tested again before sending the stop instruction OR_STOP as illustrated in FIG. 2D.

In a second variant it is also possible to test once again the steady conditions while the driver is informed and before having tested the variable conditions during the sending of the warning signal as in the case in FIG. 2C.

Figure 3A:
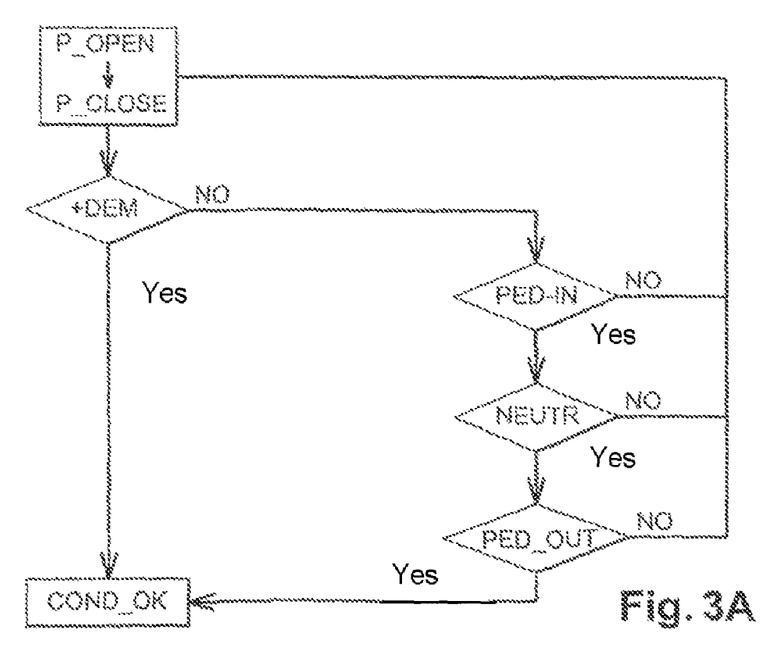
FIGS. 3A and 3B are respectively a diagram and a timing diagram illustrating an example of management of the safety conditions relating to the presence of a driver in the vehicle by the control method according to the invention.
Figure 3B:
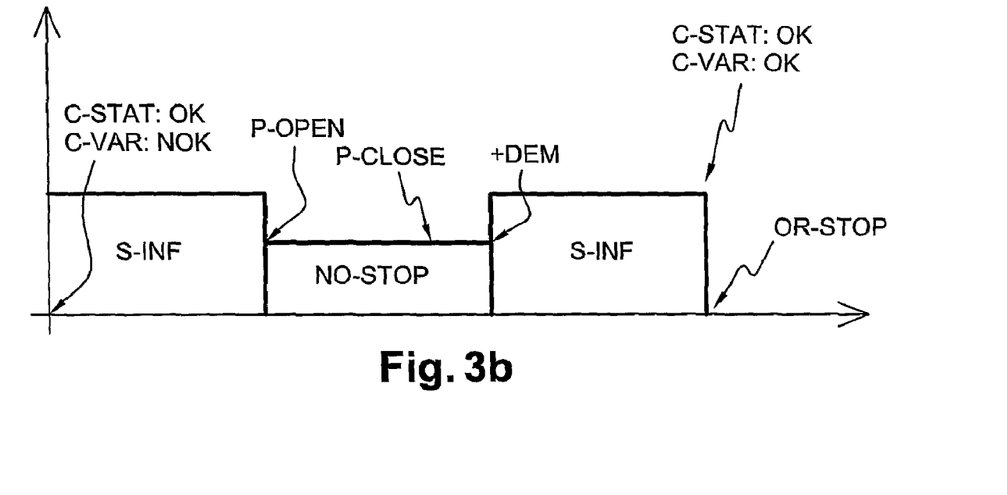

It should be noted that, if the variable conditions are not true (C_VAR: NOK), then no stop instruction OR_STOP for the thermal engine is sent. The luminous warning signal always blinks as indicated in FIG. 3B. This warns the driver that, although he has requested an automatic stopping of the thermal engine, the stopping does not take place.

The steady stopping conditions C_STAT comprise behavioral conditions relating to an action of the driver and safety conditions relating to the functioning of the vehicle.

The steady stopping conditions C_STAT are true if all the following conditions, at choice, are true.

It should be noted that it is possible to choose several steady stopping conditions amongst all the conditions listed below and that the conditions thus chosen must all be verified.

a) Behavioral Conditions:

the speed of the vehicle W is less than a given speed representing the stopping of the vehicle, at 3 km/h for preference. This makes it possible to verify that the vehicle is stopped. It is considered in fact that if the speed of the vehicle is less than 3 km/h the vehicle is stopped;

an action on a means of activating/deactivating the stopping control. The enabling means is in one non-limiting example a knob on the dashboard that has the function of activating or inhibiting the "Stop and Go" functioning of the thermal engine. It must be in an activation position, the driver thus enabling the "Stop and Go" functioning;

the driver's door is closed, this preventing the engine stopping when the driver is not in the vehicle;

detection of the driver in the vehicle is validated.

In the case where the driver has opened his door but whilst the stopping conditions were tested, as seen previously the control method refuses (NO_STOP) a stopping as long as the door is open (P_OPEN, a false steady condition, the signal S_INF no longer blinks), and if it closes again (P_CLOSE), it is sought to ensure that the driver is present in the vehicle before once again enabling stopping. The driver is considered to be present in the vehicle (COND_OK) if the safety belt is fastened or, in the absence of this information, if, in accordance with FIGS. 3A and 3B: he operates the key in the starting position (+DEM), or if not, in the following order, he completely presses the clutch pedal (PED_IN), moves the gear lever into a non-neutral position (NEUTR) and releases the clutch pedal (PED_OUT). This corresponds to a set of true steady conditions and therefore the warning signal S_INF blinks;

the bonnet is not open. This is because, if it is open, it may be thought that the driver wishes to observe his engine, and therefore does not want it to stop;

the gear lever is in the neutral position, and the clutch pedal is released, these are in fact actions that the driver performs if he actually wishes to stop the thermal engine;

the speed of the vehicle has reached a minimum speed, of at least 3 km/h for example, since the last stopping phase. This condition is applied so that the vehicle does not stop too often, for example in significant bottlenecks, in order to avoid a negative impact on the driver. For example, if the thermal engine stops and restarts, and the speed of the vehicle reaches 2 km/h and then falls again to 0, the engine will not stop;

if the air conditioning is switched on, the temperature of the vehicle is situated within a given temperature range. In the first embodiment, this temperature is the temperature of the cabin and the given range is situated preferably between 15° and 28° C. In a second embodiment, this temperature is the temperature of the air discharged from the evaporator of the air conditioning system and the given range is situated between 6 and 8 degrees Celsius. In a third embodiment, this temperature is the cabin temperature and the given range is situated between 0° and 5° C. with respect to the temperature requested by the driver. Thus, if the difference between the requested temperature and the cabin temperature is too great (requested temperature less than the cabin temperature by more than)₅° any stopping of the thermal engine, which will give rise to an automatic stopping of the air conditioning, is prevented.

In the contrary case, stopping is refused. This is because if the temperature is not in this range, cutting the thermal engine, and consequently the air conditioning, risks giving rise to comfort conditions unacceptable to the user.

b) Safety Conditions:

the temperature of the electronics of the rotary electrical machine 1, in particular of the substrate of the management module 9, is below a given temperature, representing the limit temperature that the components of the management module 9 can withstand, that is to say preferably 125° C. In the contrary case, stopping is refused in order to prevent risk of overheating at the time of restarting;

the speed of the thermal engine VM is less than a given speed VSTOP representing the stopping of the vehicle, preferably 100 revolutions/min. It is thus ensured that a thermal engine is rotating at tick-over, that is to say the vehicle is in principle stopped;

a restarting request must not be prohibited because a maximum number of starting attempts in a given time for limiting the risks of overheating has been reached;

expiry of a given period of time between two stop instructions. This is because, in the case where a stop instruction for a thermal engine fails, because of a communication problem on the communication bus CAN or a faulty of the management of the stop instructions by the engine control ECU, a second instruction will be possible only on the expiry of a period of 10 seconds. It is thus hoped that the engine control and/or the communication bus will have returned to a normal operating state.

The variable stop conditions C_VAR are true if all the following conditions, as a choice, are true.

Figure 4:
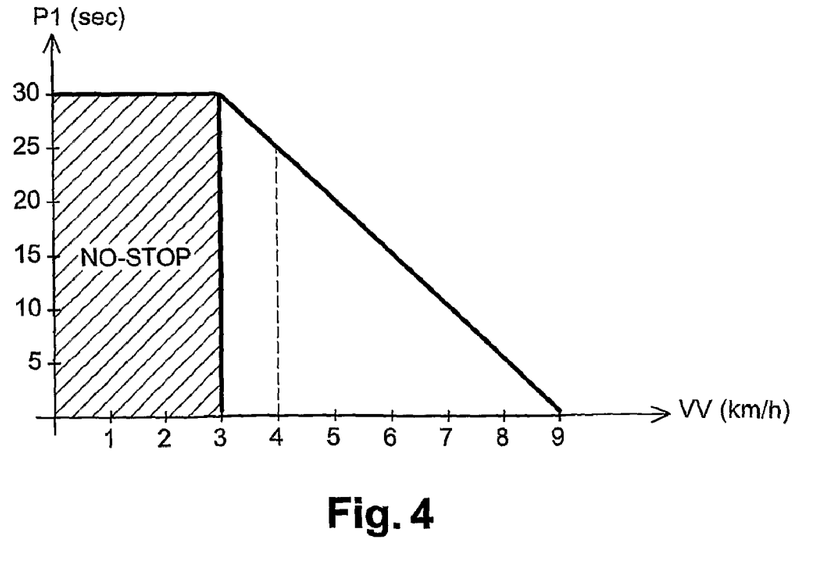
FIG. 4 is a diagram giving an example of variations of a pause time before the stopping as a function of the speed of the vehicle according to the control method according to the invention.

It should be noted that it is possible to choose several variable stop conditions from amongst all the conditions listed below, and that the conditions thus chosen must all be verified:

the battery monitoring system enables stopping; that is to say it considers that the battery is sufficiently charged to supply the on-board system of the vehicle after a stop phase (that is to say in stop phase) and to allow the restarting of the thermal engine, the on-board system comprising the consumers such as the car radio and the headlights for example;

the temperature of the thermal engine is above a given temperature, preferably around 30° C., this temperature representing the engine when hot. In this way cold restarts by the rotary electrical machine are avoided; these are in fact more tricky because of the greater friction between the various components of the engine;

a pause system P1 before stopping is provided according to the vehicle speed W reached since the last stop phase. It was seen above that stopping is refused if the vehicle has not reached at least 3 km/h. In addition, if it has not reached at least 9 km/h, stopping is enabled only after the expiry of a pause variable with the maximum speed of the vehicle reached since the last stop phase. The vehicle is thus prevented from stopping too often in a bottleneck or in the middle of a manoeuvre for parking for example.

The diagram in FIG. 4 gives a non-limiting example of pauses P1 before stopping as a function of the speed reached by the vehicle. In summary:

speed of the vehicle reached since the last stopping of the thermal engine below 3 km/h: no new stopping of the thermal engine NO_STOP (a non-true steady condition);

speed of the vehicle reached since the last stopping of the thermal engine between 3 and 9 km/h: stopping of the thermal engine after a pause of between 30 and 1 second for example;

speed of the vehicle reached since the last stopping of the thermal engine greater than or equal to 9 km/h: new stopping of the thermal engine immediate enabled without delay.

Thus, for example, if the thermal engine has stopped completely (this is therefore after the stop phase), then has restarted (engine phase), and during this engine phase the vehicle stops and is at 0 km/h, but the engine does not stop. When the vehicle restarts at 4 km/h, there will be a pause P1 of 24 seconds before having a stopping of the thermal engine.

It should be stated that the speed of the vehicle W is defined in km/h whilst the speed of the thermal engine VM is in revolutions/min.

Figure 5:
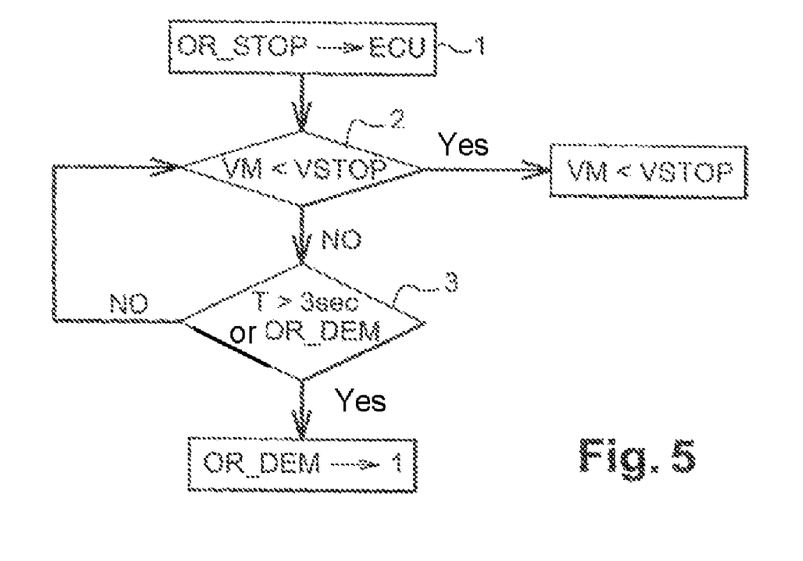
FIG. 5 is a diagram illustrating an example of management of the stopping of a thermal engine by the control method according to the invention.

After having established the various conditions verified by the control method according to the invention for deciding on a stopping of the thermal engine, it is now necessary to present how a stopping of the thermal engine is carried out in practice after a stop decision validated by the method, that is to say all the steady and prior conditions are true. This is illustrated in FIG. 5.

In a first step 1), a stop phase is entered and a stop instruction OR_STOP is sent to the engine control ECU.

At the same time, a window is opened for monitoring the speed of the thermal engine for a given period preferably of three seconds. It is considered that, empirically, if the engine has not stopped at the end of three seconds, there has been a problem. An engine generally stops at the end of approximately one second.

In a second step 2), it is verified that the thermal engine speed VM is less than a given speed VSTOP representing a stopping of the thermal engine, that is to say preferably VSTOP equal to 100 revolutions per minute.

It is considered that the thermal engine has actually stopped as soon as its speed becomes less than 100 revolutions per minute.

In a third step 3), it is verified whether the stop instruction OR_STOP has failed or not.

It is considered that the stop instruction has not failed if the thermal engine has stopped (VM<VSTOP). This is the end of the stop phase.

On the other hand, it is considered that the stop instruction has failed in the following preferential cases.

Thus, if after a delay T of three seconds, the speed of the engine VM is still greater than VSTOP=100 revolutions per minute, it is considered that the stop instruction has failed. The stop phase is then terminated. This circumstance may arise in the case of a communication problem on the bus CAN, by faulty interpretation of the stop instruction by the engine control ECU, etc.

The stop instruction may also fail because of a restart instruction OR_DEM sent before the complete stopping of the thermal engine, that is to say during a stop phase (between the sending of a stop instruction and the stopping of the thermal engine VM<100 revolutions/min). This may happen if the stop conditions are no longer true (for example if the driver presses the clutch pedal and goes into gear again). This case is called "reflex restarting". In general this preferably concerns steady stop conditions.

In a fourth step 4), if the stop instruction has failed, the restarting of the engine is then automatically requested by sending a restart instruction OR_DEM, preferably to the rotary electrical machine 1 by means of its management module 9, the machine then being configured in a starter mode making it possible to start the thermal engine.

Another stop instruction will be possible only after the expiry of an interval of time of 10 seconds for example between the two stop instructions during which it is hoped thus to have regained normal operating conditions with regard to the engine control or the communication bus. In another embodiment, the interval is taken between the end of the first stop phase triggered by a first stop instruction and the sending of a second stop instruction.

Figure 6:
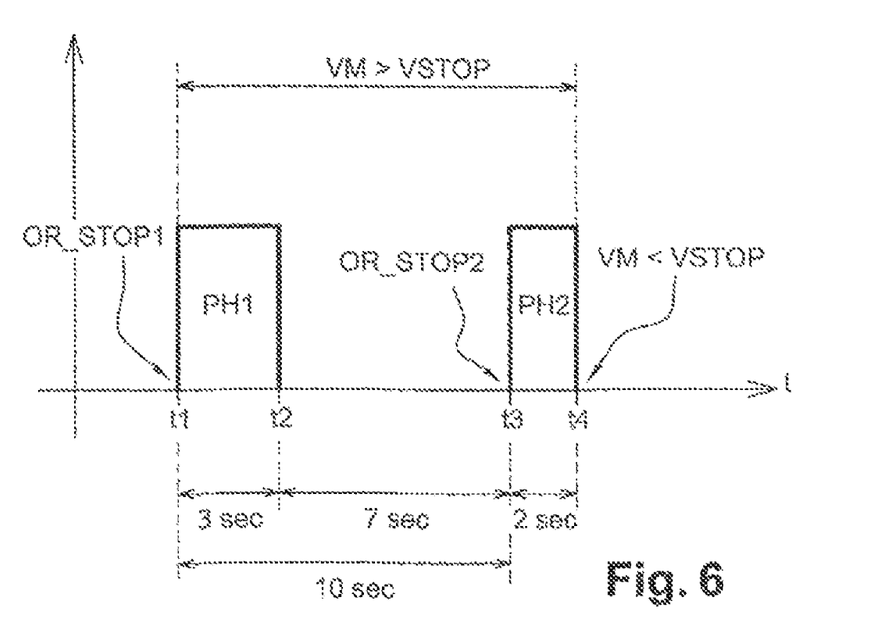
FIG. 6 is a timing diagram illustrating an example of failure of an instruction to stop the thermal engine followed by a successful stop instruction in accordance with the control method of the invention.

The timing diagram in FIG. 6 gives the example of a stop instruction that has failed followed by a successful execution of the stop instruction.

In this example, at time t1, a stop instruction OR_STOP1 is received since all the steady and variable conditions were true. This instruction was sent to the engine control ECU. The stop instruction triggers the beginning of a stop phase PH1.

At the same moment, a monitoring window of three seconds is opened and it is checked whether the engine speed VM is less than VSTOP=100 revolutions/min. Here it is still greater than 100 revolutions/min.

At time t2, the monitoring window is closed and the stop phase is ended. The stop instruction OR_STOP1 has failed.

At time t3, after a delay of 10 seconds as from the sending of the first stop instruction OR_STOP1, the sending of a new stop instruction OR_STOP2 is enabled. A second stop phase PH2 is triggered.

At the same moment, a three-second monitoring window is opened and it is checked whether the engine speed VM is less than 100 revolutions/min. Here it is still greater than 100 revolutions/min.

At the end of two seconds, at time t4, the engine speed VM is less than 100 revolutions/min, the stop phase PH2 is terminated.

The thermal engine is therefore stopped.

Naturally, in the context of the invention, in order to have access to certain information such as the cabin temperature, the electronics substrate temperature, the position of the clutch, brake and accelerator pedals, the gearbox position, the ignition key position, etc, sensors are used.

While the method herein described, and the form of apparatus for carrying this method into effect, constitute embodiments of this invention, it is to be understood that the invention is not limited to this precise method and form of apparatus, and that changes may be made in either without departing from the scope of the invention, which is defined in the appended claims

What is claimed is:

1. A control method for controlling a stopping of a thermal engine of a motor vehicle, wherein said method comprises the steps of:
   deciding on an automatic stopping of said thermal engine according on the one hand to steady conditions, substantially stable before a stop phase, and on the other hand variable conditions liable to change after a positive test on said steady conditions and before said stop phase;
   testing said steady conditions prior to said variable conditions; and
   sending a warning signal intended to inform of a probable stopping of the thermal engine after said positive test on said steady conditions.

2. The control method according to claim 1, wherein said warning signal is a light signal.

3. A control method for controlling the stopping of a thermal engine of a motor vehicle, wherein said method comprises the steps of:
   deciding on an automatic stopping of said thermal engine according on the one hand to steady conditions, substantially stable before a stop phase, and on the other hand variable conditions liable to change after a positive test on said steady conditions and before said stop phase;
   testing said steady conditions prior to said variable conditions; and
   testing said steady conditions, prior to a test on the variable conditions, after sending a warning signal.

4. The control method according to claim 3, wherein said method comprises a supplementary step of:
   if the variable conditions are true, executing said stop phase.

5. The control method according to claim 3, wherein the steady conditions comprise, separately or in combination, so-called behavioral conditions relating to an action of the driver of the vehicle and safety conditions relating to the functioning of the vehicle.

6. The control method according to claim 5, wherein said behavioral conditions comprise, separately or in combination, an action on a means of activating/deactivating the thermal engine stop control, a closure of the driver's door of the vehicle, a detection of the presence of the driver in the vehicle if the door of said driver has been opened, a closure of the bonnet of the vehicle, a speed of the vehicle lower than a given speed, a gear lever in a neutral position and the clutch pedal released, a minimum speed reached on the vehicle since the previous stopping, and, if the vehicle is equipped with an activated air conditioning device, a temperature of the vehicle lying within a given temperature range.

7. The control method according to claim 3, wherein said variable conditions comprise, separately or in combination, a sufficient battery charge state, a temperature of the thermal engine above a given temperature, and the expiry of a pause before having a stopping of said thermal engine, with a duration variable with the maximum speed of the vehicle reached since a previous stop phase.

8. The control method according to claim 3, wherein said method comprises a supplementary step of:
   sending a restart instruction during said stop phase if stop conditions are no longer satisfied.

9. Rotary electrical machine comprising a device for implementing the control method according to claim 3.

10. A control method for controlling the stopping of a thermal engine of a motor vehicle, wherein said method comprises the steps of:
- deciding on an automatic stopping of said thermal engine according on the one hand to steady conditions, substantially stable before a stop phase, and on the other hand variable conditions liable to change after a positive test on said steady conditions and before said stop phase; and
- testing said steady conditions prior to said variable conditions;
- wherein the steady conditions comprise, separately or in combination, so-called behavioral conditions relating to an action of the driver of the vehicle and safety conditions relating to the functioning of the vehicle;
- wherein said behavioral conditions comprise, separately or in combination, an action on a means of activating/deactivating the thermal engine stop control, a closure of the driver's door of the vehicle, a detection of the presence of the driver in the vehicle if the door of said driver has been opened, a closure of the bonnet of the vehicle, a speed of the vehicle lower than a given speed, a gear lever in a neutral position and the clutch pedal released, a minimum speed reached on the vehicle since the previous stopping, and, if the vehicle is equipped with an activated air conditioning device, a temperature of the vehicle lying within a given temperature range;
- wherein said detection of the driver in the vehicle is validated if at least one of the following conditions is fulfilled:
- a safety belt of the driver is fastened,
- an ignition key is actuated in the starting position, and
- the following sequence is performed: a clutch pedal is completely pressed down, a gear lever is engaged in a non-neutral position and said clutch pedal is released.

11. A control method for controlling the stopping of a thermal engine of a motor vehicle, wherein said method comprises the steps of:
- deciding on an automatic stopping of said thermal engine according on the one hand to steady conditions, substantially stable before a stop phase, and on the other hand variable conditions liable to change after a positive test on said steady conditions and before said stop phase; and
- testing said steady conditions prior to said variable conditions;
- wherein the steady conditions comprise, separately or in combination, so-called behavioral conditions relating to an action of the driver of the vehicle and safety conditions relating to the functioning of the vehicle;
- wherein said safety conditions comprise, separately or in combination, a temperature of the electronics of a rotary electrical machine coupled to said thermal engine below a given temperature, a speed of the thermal engine less than a given speed, the absence of or the prevention of a restarting instruction, and an expiry of a given time after a failure to stop the thermal engine.

12. A control method for controlling the stopping of a thermal engine of a motor vehicle, wherein said method comprises the steps of:
- deciding on an automatic stopping of said thermal engine according on the one hand to steady conditions, substantially stable before a stop phase, and on the other hand variable conditions liable to change after a positive test on said steady conditions and before said stop phase;
- testing said steady conditions prior to said variable conditions; and
- opening a window for monitoring the speed of the thermal engine with a given duration following an instruction to stop said thermal engine.

13. The control method according to claim 12, wherein said method comprises a supplementary step of:
- sending an instruction to restart the thermal engine if the speed of the thermal engine remains above a given speed within said monitoring window.

14. The control method according to claim 13, wherein said method comprises a supplementary step of:
- sending a new stop instruction in the event of failure of a first stop instruction only after the expiry of a given interval of time.

15. A device for controlling the stopping of a thermal engine of a motor vehicle, wherein said device comprises:
- means for deciding on the automatic stopping of said thermal engine according on one hand to steady conditions, substantially stable before a stop phase, and on the other hand variable conditions liable to change after a positive test on the steady conditions and before said stop phase;
- means for testing said steady conditions prior to the variable conditions; and
- means for sending a warning signal intended to inform of a probable stopping of the thermal engine, after a positive test on said steady conditions.

16. The control device according to claim 15 further comprising:
- means for executing said stop phase if the variable conditions are true.

17. A device for controlling the stopping of a thermal engine of a motor vehicle, wherein said device comprises:
- means for deciding on an automatic stopping of said thermal engine according on the one hand to steady conditions, substantially stable before a stop phase, and on the other hand variable conditions liable to change after a positive test on said steady conditions and before said stop phase;
- means for testing said steady conditions prior to said variable conditions; and
- means for testing said steady conditions, prior to a test on the variable conditions, after sending a warning signal.

* * * * *